United States Patent [19]

Roediger

[11] 4,273,732
[45] Jun. 16, 1981

[54] METHOD AND APPARATUS FOR RAISING AN AERATION APPARATUS FOR LIQUIDS

[75] Inventor: Walter H. Roediger, Frankfurt am Main, Fed. Rep. of Germany

[73] Assignee: Wilhelm Roediger GmbH & Co., Hanau am Main, Fed. Rep. of Germany

[21] Appl. No.: 94,997

[22] Filed: Nov. 16, 1979

[30] Foreign Application Priority Data

Nov. 18, 1978 [DE] Fed. Rep. of Germany ....... 2850119

[51] Int. Cl.³ ............................................. B01F 3/04
[52] U.S. Cl. ................................... 261/122; 210/220; 239/145; 239/588; 261/124; 261/DIG. 47; 285/24; 285/282
[58] Field of Search .............. 261/122, 124, DIG. 47; 239/145, 588; 210/220; 285/24, 27, 282, 283

[56] References Cited

U.S. PATENT DOCUMENTS

| 963,199 | 7/1910 | Alden | 239/588 X |
|---|---|---|---|
| 2,650,810 | 9/1953 | Nordell | 261/DIG. 47 |
| 2,989,186 | 6/1961 | Weis | 261/DIG. 47 |
| 2,997,284 | 8/1961 | Nechine | 261/DIG. 47 |
| 3,116,021 | 12/1963 | Born | 261/DIG. 47 |
| 3,339,901 | 9/1967 | Walker | 261/DIG. 47 |
| 3,738,628 | 6/1973 | Nechine | 261/DIG. 47 |
| 3,785,629 | 1/1974 | McKinney | 261/DIG. 47 |
| 3,837,629 | 9/1974 | Matras et al. | 261/DIG. 47 |
| 3,989,627 | 11/1976 | Crandall | 261/DIG. 47 |
| 4,048,267 | 9/1977 | Walker et al. | 285/24 X |
| 4,171,094 | 10/1979 | Halfen | 239/588 X |

FOREIGN PATENT DOCUMENTS

| 1609002 | 7/1970 | Fed. Rep. of Germany . |
| 2452574 | 1/1977 | Fed. Rep. of Germany . |
| 1326615 | 4/1963 | France . |
| 638185 | 5/1950 | United Kingdom . |

Primary Examiner—Richard L. Chiesa
Attorney, Agent, or Firm—Sughrue, Rothwell, Mion, Zinn and Macpeak

[57] ABSTRACT

An apparatus for raising a liquid aeration apparatus having a carrier element 62 which can be guided to a position engaging an air distributing pipe 36 to raise same by means of a guide rod 66. The movement of the guide rod is controlled by a guide device 64 disposed on the free end of a boom 52 suspended vertically above the air distributing pipe, such that the movement of the guide rod is restricted to a plane perpendicular to the air distributing pipe, thus preventing contact with and damage to aeration tubes 38 extending from the air distributing pipe.

7 Claims, 3 Drawing Figures

METHOD AND APPARATUS FOR RAISING AN AERATION APPARATUS FOR LIQUIDS

BACKGROUND OF THE INVENTION

The invention relates to an apparatus for raising a liquid aeration apparatus including an air distributing pipe and aeration tubes extending perpendicularly therefrom and preferably made of a ceramic material. The aeration apparatus is connected with a stationary support by a supply or supporting pipe arrangement by means of one or more joints, about which the apparatus can be pivoted. The raising apparatus also includes a cable which has a carrier element on its free end and a boom having an end disposed above the surface of the liquid over which end the cable is guided. The invention also relates to a method for raising the aeration apparatus.

In deferrization or neutralization processing of drinking and industrial water or for example in the biological cleansing of waste water, compressed air in the form of fine bubbles is injected into the liquid. In contrast to surface aeration, this type of aeration has the advantages that no aerosols are produced which might be questionable for hygenic reasons, that only a small amount of noise is produced and that there are no difficulties or limitations arising from low air temperatures. To enable the injection of the compressed air, filter bodies or so called aeration tubes are employed which today are made primarily of ceramic materials and are quite heavy. During operation it is necessary to periodically examine the aeration tubes or to clean or replace damaged tubes. For this reason the tubes are generally attached to an air distributing tube by means of screw or plug connections, whereby the air distributing pipe is attached to one or more vertical supply or support pipes. In order to provide access to the aeration tubes, the supply or support pipe apparatus is connected to a rigid support by means of one or more pivotable joints, so that the entire aeration apparatus can be rotated up out of the water. The possibility thus exists, if the aeration apparatus is not excessively heavy, that for example a hook attached to a rod can encompass the air distributing pipe in order to manually raise it from a special walkway arranged above the basin. However, the turbulance of the water causes difficulties in guiding the rod, in that there is the possibility of lateral movement parallel to the air distributing pipe in the vicinity of the aeration tubes. The solid matter in the basin also causes difficulties by hindering visibility so that it is difficult to encompass the air distributing pipe without contacting and thereby possibly damaging the aeration tubes. This type of contact with the aeration tubes is particularly to be avoided as the examined aeration apparatus is again lowered into the basin. With the ceramic materials employed, this type of manual operation is not possible because of the substantial weight of the portion of the apparatus which is located under water when in operation and is capable of being pivoted upward, namely the supply or support pipes, the distributing pipe and the aeration tubes. According to German AS No. 1,609,002, an aeration apparatus can be raised with the aid of a cable. In this process the cable is guided over the free end of a boom which in turn is arranged on a waste water trough running above the liquid in the central portion of the basin. Raising the aeration apparatus is thus only possible if the basin has special walkways above the liquid. A further requirement in order to be able to employ the raising apparatus according to German AS No. 1,609,002 is the special embodiment of the descent guide between the aeration apparatus and the area above the liquid. The descent guide may not have any joints or angles, because otherwise the carrier element arranged on the cable cannot slide down the descent guide in order to engage the aeration apparatus.

Various proposals have therefore been made to enable the aeration apparatus to be rotated up out of the liquid by means of mechanical raising devices disposed on the aeration apparatus itself. These mechanical raising devices, however, require a substantial expense for design and manufacture and are also subjected to severe corrosion because of the prevailing operating conditions which impair their long term operability (U.S. Pat. No. 2,997,284, U.S. Pat. No. 3,116,021, French Pat. No. 1,326,615, British Pat. No. 638,185).

In order to avoid these disadvantages it was proposed in German Pat. No. 2,452,574 to provide the pivotable portion of the aeration apparatus with a body which, because of its weight, can produce a torque in its range of rotation as the pivotable portion is rotated upward. This body also offers a point of attachment for a raising element in the form of for example a rod with a hook. There could be no cooperation between the hook and the air distributing pipe because this might damage the sensitive aeration tubes.

A device in accordance with German Pat. No. 2,452,574, however, clearly has the disadvantage that the body producing the torque must be very large making the arrangement expensive to design and construct.

If, however, an aeration apparatus like that described in German Pat. No. 2,452,574 had no body producing any torque in the rotational range of the aeration apparatus, the aeration basin would have to be emptied in order to clean or replace aeration tubes. This has the disadvantages that the cleaning of the waste water in the waste water basin must be interrupted, and that additional energy must be used in order to empty the basin, because normally in the cleaning of waste water the basin lies below the ground water table. This means, however, that the basin must be anchored in the ground so that in the empty condition it experiences no buoyancy which might cause it to move.

SUMMARY OF THE INVENTION

It is therefore an object of the present invention to provide an apparatus for raising a liquid aeration apparatus as described above, by means of which the raising is accomplished in a simple manner without the necessity of special walkways having to be disposed above the surface of the liquid from which the raising takes place, and also without the supply line to the aeration apparatus having to comply with special requirements. Furthermore, the apparatus itself should not have to include additional torque-producing bodies in order to rotate the apparatus upward, and cleaning and replacement of aeration tubes should be able to proceed without having to empty the basin. In so doing it should be assured that there can be no damage to the aeration tubes.

This object is achieved according to the invention by embodiments of the apparatus as described above, which are distinguished by the fact that the carrier element can be guided to its position encompassing the air distributing pipe by means of a guide rod which can be moved by a guide device disposed in the area of the free end of the boom, whereby the free end of the boom is disposed vertically above the air distributing pipe located in the liquid.

The guide rod itself has an L-shape, the longer shank of which represents the guide for the cable. The length of this shank is selected according to the invention so that when the short shank of the guide rod abuts the guide device the carrier element, which is detachably connected with the guide rod, can be positioned beneath the air distributing pipe. In order to avoid contact with the air distributing pipe, as the guide rod with the cable and the carrier element connected thereto are lowered, the long shank of the guide rod is moved away from the edge of the basin by pushing down on the short shank. After the guide rod is in its final position, the force applied to the short shank can be released so that the carrier element comes to rest vertically beneath the air distributing pipe.

By shortening the cable, for example by winding it onto a drum arranged on a raising apparatus which includes a boom, the carrier element comes into engagement with the air distributing pipe without contacting the aeration tubes. Damage to the aeration tubes is prevented according to the invention in that the guide rod including the cable can only be moved or pivoted in a plane running perpendicular to the air distributing pipe. Of course the guide device at the basin edge must also be arranged in the correct position. This is achieved by marking the edge of the basin when the aeration apparatus is in its raised position, in order to assure that the guide rod can only be moved in the plane lying between the aeration tubes. After the carrier element encompasses the air distributing pipe, the guide rod of the cable can be uncoupled by rotating the rod. Rotation of the rod is possible after said rod has been disconnected from the guide device.

The guide device itself, according to the invention, is adapted to the guide rod in such a manner that movement thereof is only possible in a plane perpendicular to the longitudinal axis of the air distributing pipe as the cable is lowered to the aeration apparatus. This assures, provided that the aeration apparatus is correctly positioned, that there can be no contact with the aeration tubes as the carrier device cooperates with the air distributing pipe. Because the guide rod is preferably a four sided pipe, the guide device has a shape analogous to a sleeve which is also preferably formed of four perpendicular shanks. The shank opposite the boom can be removed in order to connect or disconnect the guide rod to or from the guide device.

The method for raising an aeration apparatus with the apparatus according to the invention is distinguished by the following steps:

1. Connecting the guide rod with the carrier element,
2. Introducing the guide rod into the liquid in such a manner that the short shank of the guide rod comes into abutment with the guide device,
3. Disconnecting the guide rod from the carrier element, and
4. Shortening the cable to rotate the aeration apparatus upward.

With correct positioning of the raising apparatus on the edge of the basin (the raising apparatus being movable for example on rollers), it is then assured that as the cable is lowered, a carrier element arranged on the free end thereof can only come into contact with the air distributing pipe and damage to the aeration tubes is thus prevented.

DETAILED DESCRIPTION OF THE PREFERRED EMBODIMENT

Figure 1:
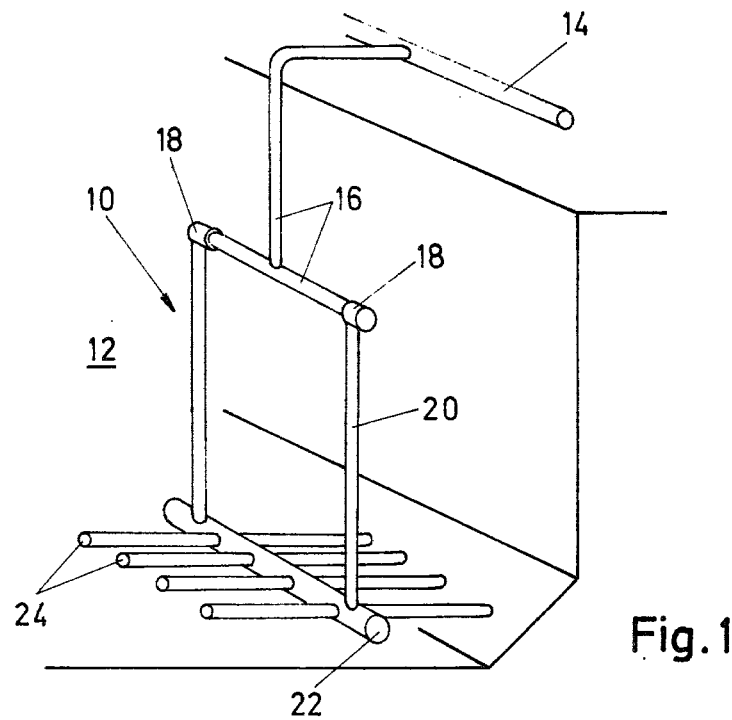
FIG. 1 is a schematic illustration of an aeration apparatus in operating condition.

In FIG. 1, reference numeral 10 designates an apparatus for aerating liquids such as waste water in a basin 12. Compressed air is fed through a main air line 14 to a supply pipe 16 rigidly mounted thereto, then through a movable or pivotable hinged supply or support pipe 20 to an air distributing pipe 22 having nozzles or aerator tubes 24. The pipes 20 are connected with the rigidly mounted supply pipe 16 at rotatable joints 18. Accordingly, the pipes 20 form a portion of the air supply between the main line 14 and the air distributing pipe 22, and also constitute the suspension means for the air distributing pipe 22 and the aerator tubes 24 disposed thereon. It is apparent that by using appropriate rigidifying elements the air distributing pipe 22 can also be connected to the supply pipe 16 through a single supply pipe 20 with a single joint. Similarly, by proper choice of the type of pipe joint more than two supply and support pipes can also be provided.

Figure 2:
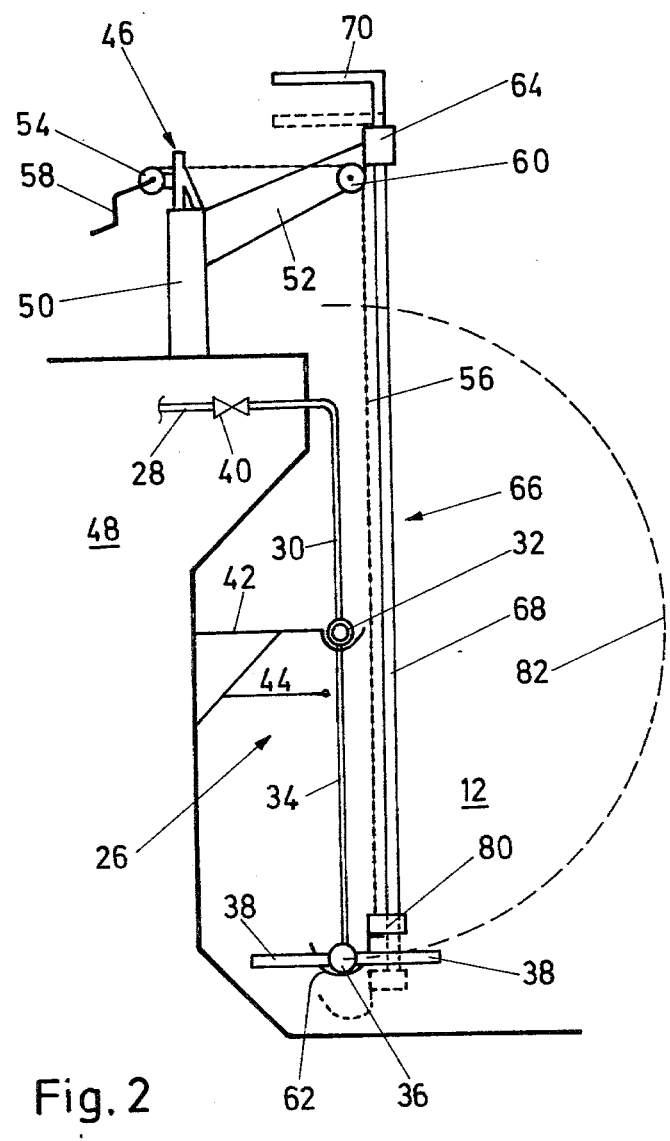
FIG. 2 is a side view of an aeration apparatus in operating condition including an apparatus for rotating the apparatus upward.

FIG. 2 is a side view of an apparatus 26 for aerating liquids such as waste water in a basin 12. As in FIG. 1, compressed air is fed to an air distributing pipe 36 and aerator tubes 38 through a main supply line 28, a supply pipe 30 rigidly mounted thereto, a joint 32 and a supply pipe 34 connected thereto. The compressed air supplied to the aerator tubes 38 can be controlled by a valve 40 disposed in the supply pipe 30.

A holder 42 is provided on the basin wall to prevent the rigidly mounted supply pipe 30 from having to support the full weight of the aeration apparatus. This support 42 reinforces the supply pipe 30 in the area of the joint 32 which runs parallel to the air distributing pipe 36. Furthermore, a spacing element or buffer 44 is provided on the basin wall which prevents the aeration apparatus from coming into contact with the wall of the basin.

In order to be able to clean or replace damaged aerator tubes 38, the apparatus must be rotated up out of the water in order to reach the vicinity of a walkway 48 at the edge of the basin. For this purpose, a raising apparatus 46, which can be movable on rollers, is detachably fastened to the walkway 48 above the horizontal portion of the aeration apparatus. The raising apparatus 46 consists of a base 50 on which a boom 52 is disposed. A winch drum 54 is also provided thereon, by means of which a cable 56 can be wound up with the aid of a crank 58.

At its free end the cable 56 has a carrier device in the form of a hook 62. The hook is intended to encompass the air distributing device 36 in order, by winding the cable 56 on the drum 54, to enable the rotation of the movable portion of the aeration apparatus 26 about the axis formed by the joint 32 upward and out of the liquid along the path 82 shown by the broken line in FIG. 2. For this purpose the cable is guided over a roller 60 disposed at the forward end of the boom 52. In order to prevent the hook 62 from coming into contact with and thus destroying the easily damaged aeration tubes 38 as it encompasses the air distributing tube 36, the boom 52 has a guide device 64 at its forward free end in which an L-shaped guide rod 66 can be mounted. The guide device 64, which is shown in section in FIG. 3, assures that the guide rod 66 can only be moved or rotated in a single plane perpendicular to the air distributing tube 36 and only with proper positioning of the raising apparatus 46 and the guide rod 66. In order to get the hook 62 into engagement with the air distributing tube 36, the forward free end of the long shank 68 of the guide rod 66 is connected with the hook 62 by means of a coupling 80, and the guide rod 66 is placed in the guide device 64. By lowering the guide rod 66 into the waste water basin 12 it is assured that the hook will not be forced to make any uncontrolled movement by, for example, the turbulence of the water, so that there can be no unintentional contact of objects therein. Neither can floating slime in the waste water hinder the introduction of the cable into the waste water basin 12, because it is guided by the guide device 64 outside of the waste water basin by means of the guide rod 66. The feed or supply pipes 30 and 34 do not require any special shape, because the carrier element 62 only comes into engagement with the air distributing pipe 36. The length of the long shank 68 of the guide rod 66 is such that when the short shank 70 abuts the guide device 64, the hook arrives in position beneath the air distributing pipe 36. In order to prevent any contact between the hook 62 and the air distributing pipe 36 as the cable 56, i.e. the guide rod 66, is lowered, the guide rod can advantageously be inclined away from the edge of the basin by applying downward force to the short shank 70. After the bent short shank 70 of the guide rod 66 arrives in abutment against the guide element 64, the inclined portion 70 thereof is then rotated so that the hook 62 travels horizontally or at least approximately horizontally beneath the air distributing pipe 36. The drum 54 can then be turned by means of the crank 58 so that the cable 56 is wound thereon. As soon as resistance is detected in winding the cable 56, it is assured that the hook 62 is actually encompassing the air distributing pipe 36. At this point the guide rod 66 is detached from the guide device 64 in order that by means of, for example, a rotational movement of the guide rod 66 about its longitudinal axis, the hook 62 and the guide rod 66 can be uncoupled. For this reason it is advantageous to form the coupling 80 as a bayonet connection. After detachment and withdrawal of the guide rod 66, the cable 56 is wound onto the drum 54 until the aeration apparatus with the air distributing pipe 36 and the aeration tubes 38 is rotated along the circular path 82 until it emerges from the surface of the waste water and is brought into a position near the walkway 48 enabling the aeration tubes 38 to be cleaned or replaced. After this operation is completed, the cable 56 together with the aeration apparatus is again lowered into the waste water basin 12. As soon as the aeration apparatus 26 is again in its operating position, the cable is loosened so that the hook 62 can no longer contact the air distributing pipe 36 and the aeration tubes 38. It is advantageous at this point for a rod (not shown) at the level of the walkway 48 to push the cable 56 away from the edge of the basin in order to prevent damage to the aeration tubes 38 as the cable is rewound.

Figure 3:
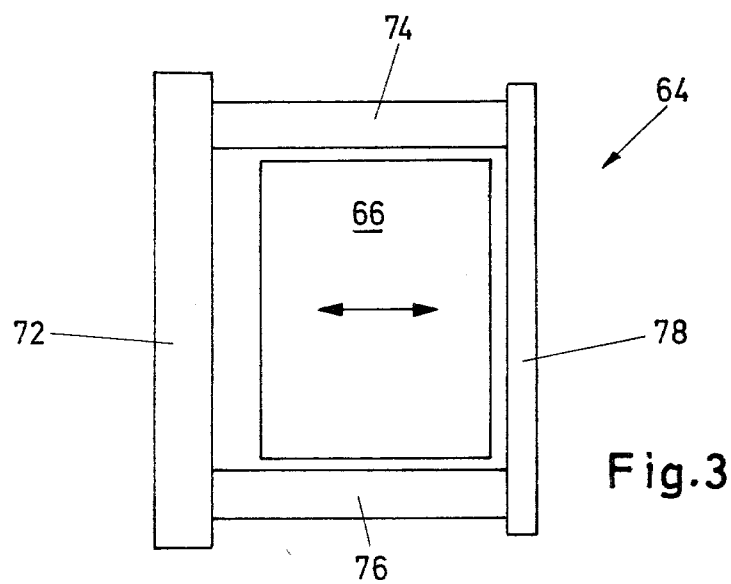
FIG. 3 is a sectional view of a guide device present in FIG. 2.

FIG. 3 is a schematic illustration of a guide device for the guide rod 66. Because the guide tube 66 in the exemplary embodiment according to FIG. 2 consists of a four sided tube, the guide device 64 also has a four sided internal cross section formed by four shanks 72, 74, 76 and 78. The shank 72 is disposed on the side facing the boom 52 and the opposite parallel shank 78 faces the basin 12. This shank 78 is also capable of being detached from the guide device 64 to make it possible for the guide rod 66 to be introduced into the guide device 64 and removed therefrom. The arrow indicates that the guide rod 66 can only be removed or pivoted parallel to the shanks 74 and 76.

The distance between the shanks 74 and 76 is chosen so that the guide rod 66 housed in the guide device 64 can only be moved or pivoted in a plane perpendicular to the longitudinal axis of the air distributing pipe 36 as it is lowered into the basin 12. Thus, given proper positioning of the raising apparatus 46 on the basin edge on the walkway 48, it is assured that the guide rod 66 and also the hook 62 coupled to the free end of the guide rod 66 cannot damage the aeration tubes 38 as they cooperate with the air distributing pipe 36.

To clarify the method steps, FIG. 2 illustrates two positions of the guide rod 66 with the cable 56 and the hook 62 attached thereto. The position indicated by the broken line illustrates that the hook 62 is located below the air distributing pipe 36 in a horizontal position after being lowered into the waste water basin 12. The position of the above-described elements shown by solid lines illustrates the situation in which the hook 62 encompasses the air distributing pipe 36 so that the guide rod 66 can be detached from the cable 56.

Without departing from the scope of the invention, a raising of the aeration apparatus 26 can also take place solely by a corresponding guide rod with a hook attached to the free end thereof. In this case the rod is raised and lowered by a screw drive. The screw drive itself is pivotably arranged at the free end of the boom 52.

What is claimed is:

1. An apparatus for raising a liquid aeration apparatus submerged in a basin and including a generally horizontal air distributing pipe (36) having a plurality of ceramic aeration tubes (38) extending outwardly therefrom, said aeration apparatus being connected with a stationary support (42) by means of an air supply pipe (34) through a joint (32) about which said aeration apparatus can be pivotally raised, a cable (56), a carrier element (62) coupled to a free end of the cable for engaging the air distributing pipe, and a boom (52) disposed above the surface of a liquid over the free end of which boom said cable is guided, characterized by:
   (a) the free end of said boom being disposed vertically above the submerged air distributing pipe,
   (b) guide means (64) mounted on the free end of said boom,
   (c) a guide rod (66) mounted in said guide means for:
      (1) axially slidable movement, and
      (2) limited pivotal movement in a plane perpendicular to the air distributing pipe,
   (d) means for detachably connecting the carrier element to a lower end of the guide rod, and
   (e) the boom being movably mounted to the basin for operative placement at a plurality of sites, whereby the guide rod may be pivoted out of the path of the aeration tubes to prevent their damage, the carrier element may be lowered by the guide rod to a depth greater than that of the air distributing pipe and thereafter brought beneath the pipe by pivoting back the guide rod, the rod may be detached from the carrier element and retracted, and the cable may be taken up to raise the carrier element and aeration apparatus engaged thereby.

2. Apparatus according to claim 1, wherein the guide rod has an L-shape, a longer shank (68) of which is connected to the carrier element.

3. Apparatus according to claim 2, wherein the long shank has a length which is longer than the distance between the guide means and the submerged air distributing pipe.

4. Apparatus according to claim 1, wherein the guide rod has a rectangular cross-section.

5. Apparatus according to claim 4, wherein the guide means is a sleeve having four perpendicular walls (72, 74, 76, 78), of which the wall (78) opposite the boom can be removed.

6. A method for raising a submerged liquid aeration apparatus including an air distributing pipe (36) and a plurality of ceramic aeration tubes (38) extending perpendicularly therefrom, a stationary support (42), an air supply pipe (34) connected at one end to the air distributing pipe and connected at its other end with the stationary support through a rotatable joint (32) about which the aeration apparatus can be pivoted, a cable (56) having a carrier element (62) coupled to its free end for engaging the air distributing pipe, a boom (52) mounted above the surface of the liquid with its free end disposed vertically above the air distributing pipe, means for guiding the cable over said free end of the boom, guide means (64) mounted on the free end of the boom, and a guide rod (66) slidably mounted in the guide means for guiding the carrier element into engagement with the air distributing pipe, characterized by the following steps:
 (a) connecting the guide rod to the carrier element,
 (b) lowering the guide rod into the liquid until a short shank (70) of the guide rod comes into abutment with the guide means,
 (c) disconnecting the guide rod from the carrier element, and
 (d) taking in the cable to rotate the aeration apparatus upwardly.

7. A method according to claim 6, wherein
 (a) the guide rod is pivotally displaced within the guide means away from a vertical orientation during its lowering into the liquid to prevent the guide rod and the carrier element from striking and damaging the aeration tubes, and
 (b) the guide rod is pivotally displaced back into a vertical orientation after its short shank abuts the guide means.

* * * * *